US010110826B2

(12) United States Patent
Nakao

(10) Patent No.: US 10,110,826 B2
(45) Date of Patent: Oct. 23, 2018

(54) IMAGING WITH ADJUSTMENT OF ANGLE OF VIEW

(71) Applicant: SONY CORPORATION, Tokyo (JP)

(72) Inventor: Daisuke Nakao, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/111,496

(22) PCT Filed: Feb. 13, 2015

(86) PCT No.: PCT/JP2015/053925
§ 371 (c)(1),
(2) Date: Jul. 14, 2016

(87) PCT Pub. No.: WO2015/129479
PCT Pub. Date: Sep. 3, 2015

(65) Prior Publication Data

US 2016/0360082 A1 Dec. 8, 2016

(30) Foreign Application Priority Data

Feb. 25, 2014 (JP) .................................. 2014-034370

(51) Int. Cl.
*H04N 5/235* (2006.01)
*G03B 15/00* (2006.01)
(Continued)

(52) U.S. Cl.
CPC ........... *H04N 5/2353* (2013.01); *G03B 15/00* (2013.01); *H04N 5/2253* (2013.01);
(Continued)

(58) Field of Classification Search
None
See application file for complete search history.

(56) References Cited

U.S. PATENT DOCUMENTS 6,970,198 B1 * 11/2005 Schinner ............ H04N 5/23293
348/333.01
7,057,653 B1 * 6/2006 Kubo .................... H04N 1/393
348/229.1
(Continued)

FOREIGN PATENT DOCUMENTS

JP 2000-278598 A 10/2000
JP 2007-324965 A 12/2007
(Continued)

OTHER PUBLICATIONS

JP 2008-292663A; Maeda Fuyuhiko, Fujifilm Corp; Camera and Portable Electronic Equipment; Apr. 12, 2008; English Translation.*

(Continued)

*Primary Examiner* — Cynthia Segura
(74) *Attorney, Agent, or Firm* — Chip Law Group

(57) ABSTRACT

The present technology relates to an imaging apparatus and method, and a program to allow easier and quicker adjustment of an angle of view.
The imaging apparatus photographs and displays a live view image, while a user adjusts the angle of view by seeing the live view image to cause the imaging apparatus to photograph an image to be photographed. At this time, an internal information detecting unit detects information about the photographed image as internal detected information, and an external information detecting unit detects conditions or the like of the imaging apparatus as external detected information. A photographing settings changing unit determines whether astronomical photographing is to be performed according to at least the internal detected information or the external detected information, and sets an upper limit value of the shutter speed during photographing the live view image to be larger in the astronomical photographing than (Continued)

the value of the normal photographing. The present technology can be applied to digital still cameras.

18 Claims, 5 Drawing Sheets

(51) Int. Cl.
    *H04N 5/232*     (2006.01)
    *H04N 5/225*     (2006.01)
    *H04N 5/357*     (2011.01)
    *G03B 17/18*     (2006.01)

(52) U.S. Cl.
    CPC ....... *H04N 5/2254* (2013.01); *H04N 5/23245* (2013.01); *H04N 5/23293* (2013.01); *H04N 5/357* (2013.01); *G03B 17/18* (2013.01)

(56) References Cited

U.S. PATENT DOCUMENTS

| | | | | |
|---|---|---|---|---|
| 9,805,240 | B1* | 10/2017 | Zheng | G06K 7/10722 |
| 2003/0067551 | A1* | 4/2003 | Venturino | H04N 5/23293 |
| | | | | 348/364 |
| 2007/0014543 | A1* | 1/2007 | Nakase | G11B 27/329 |
| | | | | 386/224 |
| 2009/0160968 | A1* | 6/2009 | Prentice | H04N 5/23245 |
| | | | | 348/223.1 |
| 2010/0020198 | A1* | 1/2010 | Okamoto | H04N 5/23212 |
| | | | | 348/231.99 |
| 2010/0194922 | A1* | 8/2010 | Honda | H04N 5/23245 |
| | | | | 348/231.99 |
| 2010/0194925 | A1* | 8/2010 | Kubota | H04N 5/23212 |
| | | | | 348/234 |
| 2010/0201843 | A1* | 8/2010 | Fukui | H04N 5/23219 |
| | | | | 348/229.1 |
| 2010/0201848 | A1* | 8/2010 | Fukui | H04N 5/23219 |
| | | | | 348/234 |
| 2010/0231777 | A1* | 9/2010 | Shintani | H04N 5/232 |
| | | | | 348/333.06 |
| 2011/0141228 | A1* | 6/2011 | Shimada | G03B 37/00 |
| | | | | 348/36 |
| 2011/0149111 | A1* | 6/2011 | Prentice | H04N 5/23216 |
| | | | | 348/229.1 |
| 2011/0157425 | A1* | 6/2011 | Nakayama | H04N 5/23245 |
| | | | | 348/234 |
| 2011/0187914 | A1* | 8/2011 | Lee | H04N 5/222 |
| | | | | 348/333.11 |
| 2011/0216220 | A1* | 9/2011 | Chiang | H04N 5/235 |
| | | | | 348/229.1 |
| 2012/0105673 | A1* | 5/2012 | Morales | H04N 5/2355 |
| | | | | 348/229.1 |
| 2013/0314402 | A1* | 11/2013 | Furumura | G03B 35/02 |
| | | | | 345/419 |
| 2014/0184866 | A1* | 7/2014 | Ogushi | H04N 5/23212 |
| | | | | 348/308 |
| 2014/0192253 | A1* | 7/2014 | Laroia | G06T 11/60 |
| | | | | 348/360 |
| 2014/0285698 | A1* | 9/2014 | Geiss | H04N 5/23293 |
| | | | | 348/333.05 |
| 2016/0094770 | A1* | 3/2016 | Chen | H04N 5/23254 |
| | | | | 348/229.1 |
| 2016/0269635 | A1* | 9/2016 | Ito | H04N 5/23209 |

FOREIGN PATENT DOCUMENTS

| | | | | |
|---|---|---|---|---|
| JP | 2008292663 | A | * 12/2008 | ............... G03B 7/08 |
| JP | 2010-135904 | A | 6/2010 | |
| JP | 2010-161760 | A | 7/2010 | |
| JP | 2010-178248 | A | 8/2010 | |
| JP | 2013-38497 | A | 2/2013 | |
| JP | 2013-153500 | A | 8/2013 | |
| WO | 2008-149925 | A | 12/2008 | |

OTHER PUBLICATIONS

International Search Report Received for PCT Application No. PCT/JP2015/053925, dated May 12, 2015, pp. 2.

Written Opinion received for PCT Application No. PCT/JP2015/053925, dated May 12, 2015, pp. 7.

* cited by examiner

IMAGING WITH ADJUSTMENT OF ANGLE OF VIEW

CROSS REFERENCE TO RELATED APPLICATIONS

This application is a U.S. National Phase of International Patent Application No. PCT/JP2015/053925 filed on Feb. 13, 2015, which claims priority benefit of Japanese Patent Application No. 2014-034370 filed in the Japan Patent Office on Feb. 25, 2014. Each of the above-referenced applications is hereby incorporated herein by reference in its entirety.

TECHNICAL FIELD

The present technology relates to an imaging apparatus and method, and a program, and more particularly, to an imaging apparatus and method, and a program for enabling easier and quicker adjustment of an angle of view.

BACKGROUND ART

It is regarded that a favorable condition for astronomical photographing is extremely dark surrounding environment. When the astronomical photographing is performed under such a favorable condition, it has been difficult to adjust the angle of view during photographing by an imaging apparatus in which a so-called live view image is displayed on an electronic view finder (EVF) or the like.

This is because immediate responsiveness is considered to be very important in original settings of the imaging apparatus that displays a live view image for adjusting the angle of view, and the exposure time is previously set so as not to exceed a certain period of time. Without an upper limit of the exposure time during photographing, a moving object may be blurred, for example, when the moving object is photographed.

Thus, the upper limit of the exposure time is usually determined, and if the surroundings are extremely dark and the minimum amount of light necessary to recognize the angle of view cannot be secured, the live view image becomes completely dark, such that a user cannot determine the angle of view. In particular, in cases where the amount of light is extremely small, a gain is forcedly increased, causing only red noise to stand out in the live view image.

As a result of this, a user has to repeat the steps of photographing a still image to check the photographed result and adjusting the angle of view to photograph the image again, when the user adjusts the angle of view in astronomical photographing, for example, so as to put mountains in the lower ⅓ area of the image with sky occupying the rest of the image. Astronomical photographing requires long exposure of 30 seconds to several minutes to photograph a still image. It has, therefore, been highly burdensome step for the user to repeatedly photograph images to adjust the angle of view.

An imaging apparatus including a button to interrupt exposure of a live view display during photographing in the dark place, to enable start of new exposure of a live view image at timing designated by a user is proposed (e.g., see Patent Document 1).

Further, an imaging apparatus capable of accepting changes in the updating cycle of an image, a gain value, or an aperture value during the display of the live view image is proposed (e.g., see Patent Document 2).

CITATION LIST

Patent Documents

Patent Document 1: Japanese Patent Application Laid-Open No. 2002-290803
Patent Document 2: Japanese Patent Application Laid-Open No. 2007-295401

SUMMARY OF THE INVENTION

Problems to be Solved by the Invention

With the above technology, however, easy and quick adjustment of the angle of view has not been realized.

For example, in the technology of providing a button to interrupt exposure of the live view display, it is possible to start new exposure immediately after adjusting the angle of view. However, a live view image having a sufficient image quality cannot be obtained yet in the extremely dark photographing surroundings. Since the angle of view cannot be confirmed in the live view image, it has been necessary to repeat the steps of photographing and confirming the still image and adjusting the angle of view.

In the technology of accepting a change of the updating cycle of the image or the like during the display of the live view image, the user needs to set the angle of view manually, requiring burdensome work.

The present technology has been made in view of the above situation, and an object is to adjust the angle of view more easily and quickly.

Solutions to Problems

An imaging apparatus according to an aspect of the present technology includes a setting unit for setting exposure time of a live view image to be longer in the case of photographing in the dark place than the exposure time of other types of photographing.

The exposure time of an image being photographed can be set longer than predetermined exposure time when the photographing is done in the dark place.

The setting unit can increase an upper limit value of the exposure time for the live view image in the case of photographing in the dark place, compared to the exposure time setting of other types of photographing.

The setting unit can set a driving method of the imaging device in the case of photographing in the dark place, that is different from the driving method of other types of photographing.

The setting unit can set image processing in the case of photographing in the dark place different from other types of photographing.

The image processing may be size conversion processing.
The image processing may be noise reduction processing.
The imaging apparatus may further be provided with a control unit that determines whether the photographing is performed in the dark place.

The control unit can determine whether the photographing is performed in the dark place according to the exposure time of a photographed image.

The control unit can determine whether the photographing is performed in the dark place according to whether the imaging apparatus is fixed on a tripod.

The control unit can determine whether the photographing is performed in the dark place according to an elevation angle of the imaging apparatus.

The control unit can determine whether the photographing is performed in the dark place according to a degree of darkness of the entire live view image.

The control unit can determine whether the photographing is performed in the dark place according to the likelihood of night scene of the live view image.

The photographing in the dark place can be regarded as astronomical photographing.

A photographing method or program provided as an aspect of the present technology includes a step of setting exposure time of the live view image to be longer in the case of photographing in the dark place than exposure time of other types of photographing.

In the aspect of the present technology, the exposure time of the live view image is set to be longer in the case of photographing in the dark place than the exposure time of other types of photographing.

Effects Of The Invention

According to an aspect of the present technology, the angle of view can be adjusted more easily and quickly.

Effects of the present technology are not limited to the effects described herein, and may include any of the effects described in the present disclosure.

MODES FOR CARRYING OUT THE INVENTION

An embodiment to which the present technology is applied will be described below by referring to the accompanying drawings.
<First Embodiment>
<Example Structure of Imaging Apparatus>

The present technology is to enable easier and quicker adjustment of an angle of view by determining whether photographing is performed in an extremely dark place based on internal detected information about an image to be photographed, and also based on external detected information, such as conditions of an imaging apparatus, different from the information about the image to be photographed, and changing photographing settings according to the result of determination. Photographing in the extremely dark place indicates, for example, photographing in very dark photographing surroundings, such as in astronomical photographing, that require relatively long exposure. In the following description, the astronomical photographing will be described as an example of photographing in the dark place. In addition, the exposure time, for example, of the image to be photographed is set to be longer than predetermined time during the photographing in the dark place.

An embodiment to which the present technology is applied is specifically described.

Figure 1:
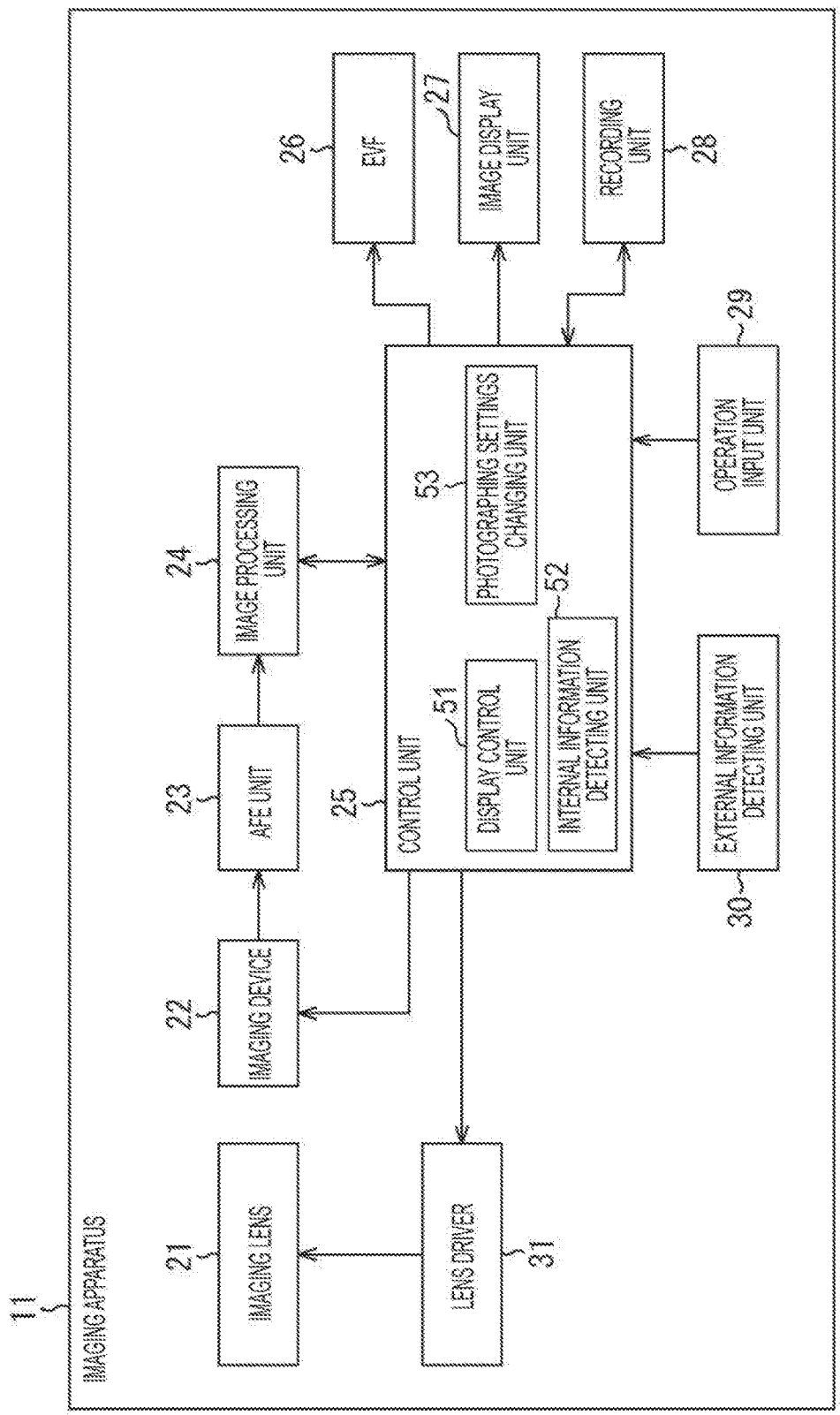
FIG. 1 illustrates an example structure of an imaging apparatus.

FIG. 1 illustrates an example structure of an embodiment of an imaging apparatus to which the present technology is applied.

An imaging apparatus 11 is formed by, for example, a digital single-lens camera, a digital still camera, a digital video camera, or other devices such as a portable telephone, a multifunctional portable phone, or the like that include an image display device, such as an EVF or a liquid crystal display device.

The imaging apparatus 11 illustrated in FIG. 1 includes an imaging lens 21, an imaging device 22, an analog front end (AFE) unit 23, an image processing unit 24, a control unit 25, an EVF 26, an image display unit 27, a recording unit 28, an operation input unit 29, an external information detecting unit 30, and a lens driver 31.

The imaging lens 21 includes a plurality of lenses and the like to collect incident light from an object and guide the light to the imaging device 22. The imaging lens 21 includes a diaphragm, a focus lens, a shutter, and the like which are not illustrated.

The imaging device 22 includes a complementary metal oxide semiconductor (CMOS) image sensor, a charge coupled device (CCD), or the like, having an imaging surface in which a plurality of pixels is provided, that receives incident light from the object through the imaging lens 21 on the imaging surface. The imaging device 22 supplies the image obtained by photoelectric conversion of the light from the object to the AFE unit 23.

The image photographed by the imaging device 22 particularly includes a photographed image and a live view image.

The photographed image is taken by a user operating a shutter button for a record for appreciation by the user. The photographed image is described as a still image hereinafter.

In contrast, the live view image is a moving image for confirming the angle of view presented to the user in advance at the time of photographing or, more particularly, before photographing the image to be photographed to confirm an angle of view or the like of the image to be photographed. The live view image is also called, for example, a through image.

The AFE unit 23 performs an analog/digital (A/D) conversion on the image supplied from the imaging device 22 and supplies the obtained image to the image processing unit 24. The image processing unit 24 is formed by a large scale integration (LSI) that performs various types of image processing, such as demosaic processing, noise reduction processing, or gamma correction processing, on the image supplied from the AFE unit 23, and supplies the obtained image to the control unit 25.

The control unit 25 controls the entire operation of the imaging apparatus 11 according to a signal or the like supplied from the operation input unit 29. For example, the control unit 25 supplies the photographed image, which has been received from the image processing unit 24, to the recording unit 28 for a record, or reads the photographed image from the recording unit 28. The control unit 25 also controls the lens driver 31 to drive the imaging lens 21 for focus control or driving of a diaphragm or a shutter.

The control unit 25 also includes a display control unit 51, an internal information detecting unit 52, and a photographing settings changing unit 53. The display control unit 51 supplies the photographed image or the live view image to the EVF 26 or the image display unit 27 to control the display of such images.

The internal information detecting unit 52 detects, as internal detected information, information obtained from the live view image supplied from the image processing unit 24, or information, such as information of settings, used in photographing the image to be photographed. The photographing settings changing unit 53 determines whether the photographing of the photographed image is performed by astronomical photographing, based on the internal detected information obtained by the internal information detecting unit 52 and also based on the external detected information supplied from the external information detecting unit 30. The photographing settings changing unit 53 then provides photographing settings of the image, or the liver view image in particular, according to the result of determination.

The astronomical photographing refers to photographing the sky (night sky) in the extremely dark photographing surroundings. However, the astronomical photographing is only an example of photographing in the dark place, as mentioned above, and the present technology is not limited to the astronomical photographing. It is assumed that, when the astronomical photographing is not determined, the normal photographing is performed.

The EVF 26 is an electronic viewfinder formed by, for example, an organic electro luminescence (EL) or a liquid crystal display device to display the live view image or the photographed image supplied from the display control unit 51. The image display unit 27 is formed by, for example, the organic EL or the liquid crystal display device to display the live view image or the photographed image supplied from the display control unit 51.

The imaging apparatus 11 includes a sensor which is not illustrated. When the sensor detects, for example, that the user is looking into the EVF 26, the display control unit 51 supplies the live view image or the photographed image to the EVF 26 for display. In contrast, if the sensor does not detect the fact that the user is looking into the EVF 26, the display control unit 51 supplies the live view image or the photographed image to the image display unit 27 for display.

The recording unit 28 is formed by, for example, a removable recording medium detachable from the imaging apparatus 11 to record the image supplied from the control unit 25 and supply the recorded image to the control unit 25. The operation input unit 29 includes various types of buttons and switches, such as a shutter button provided on the imaging apparatus 11, or a touch panel superposed on the image display unit 27, to supply a signal corresponding to the operation of the user to the control unit 25.

The external information detecting unit 30 is formed by, for example, a gyro sensor that detects information such as conditions of the imaging apparatus 11, other than the internal detected information, as external detected information, and supplies such information to the control unit 25. The lens driver 31 drives the imaging lens 21 according to the control of the control unit 25 to perform focus control, diaphragm control, or shutter control.

<Determination of Astronomical Photographing and Settings Therefor>

Figure 2:
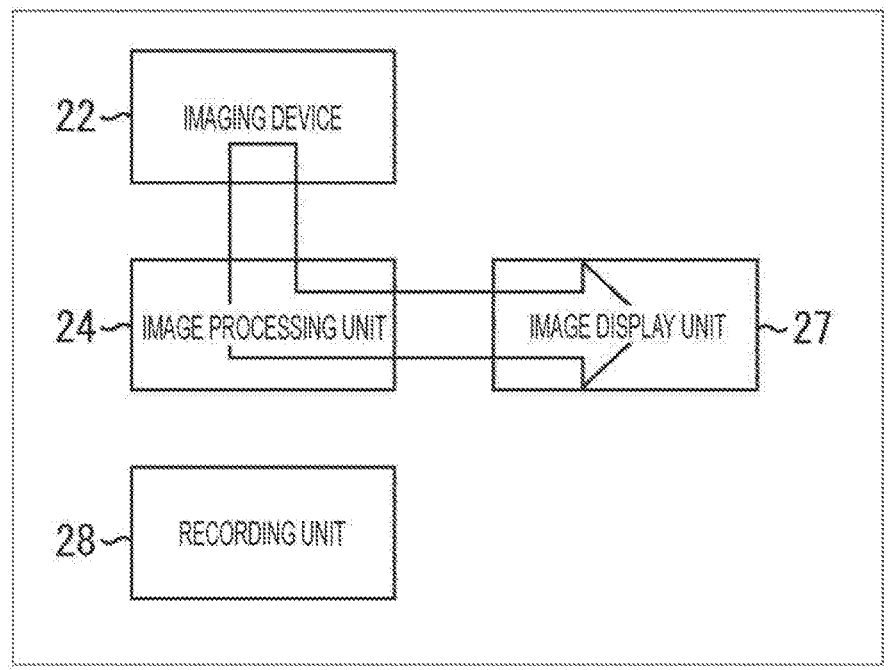
FIG. 2 is an explanatory diagram for explaining photographing of an image to be photographed.

The imaging apparatus 11 obtains the live view image nearly in real time by the imaging device 22 in photographing the image to be photographed as illustrated in FIG. 2. The obtained live view image is supplied to the image display unit 27 or the EVF 26 for display through the Image processing unit 24 or the like. At this time, the live view image is not recorded in the recording unit 28.

The user who photographs the image sees the live view image displayed on the image display unit 27 or the like to adjust the angle of view, as appropriate, for example. When proceeding to actual photographing, that is, photographing of the image to be photographed, the user presses the shutter button which functions as the operation input unit 29.

Figure 3:
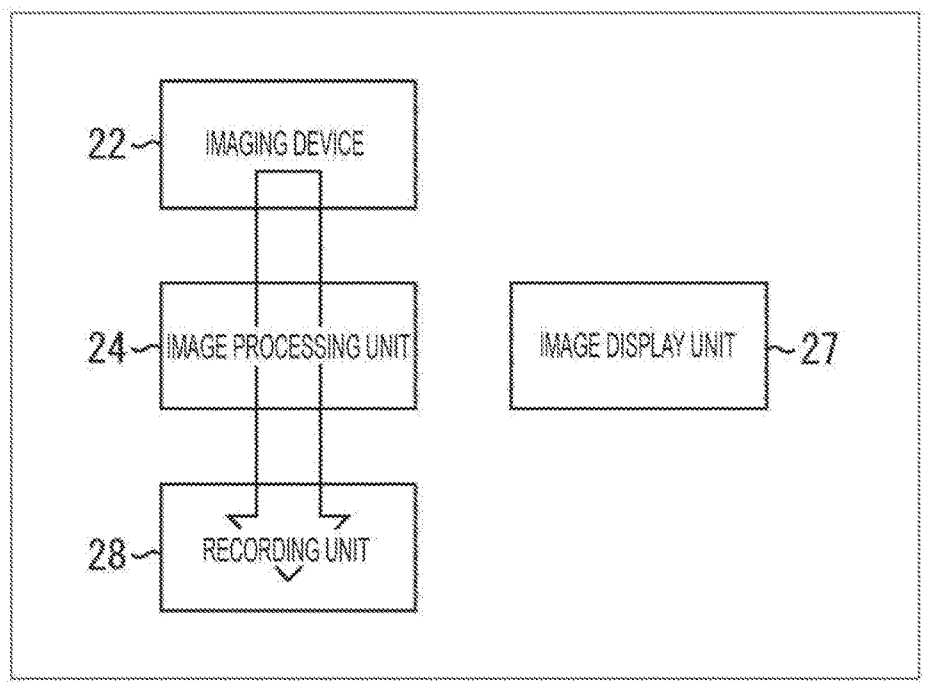
FIG. 3 is an explanatory diagram for explaining photographing of an image to be photographed.

As illustrated in FIG. 3, a still image is thus taken as the photographed image by the imaging device 22, and the obtained photographed image is supplied to the recording unit 28 for record via the image processing unit 24 or the like.

Thus, the live view image photographed as the moving image for confirming the angle of view can be photographed at a shutter speed different from the shutter speed of the photographed image. Usually, the imaging apparatus 11 does not use an extremely slow shutter speed, because of due consideration of immediate responsiveness of the live view. Instead, the imaging apparatus 11 secures brightness by increasing the gain of the image to improve confirmation property of the angle of view.

In the astronomical photographing, however, very small amount of light is obtained to take the live view image, such that image quality sufficient for deciding the angle of view cannot be obtained in many cases. Thus, it can be said that it is difficult to achieve both the immediate responsiveness and the confirmation property of the angle of view.

Figure 4:
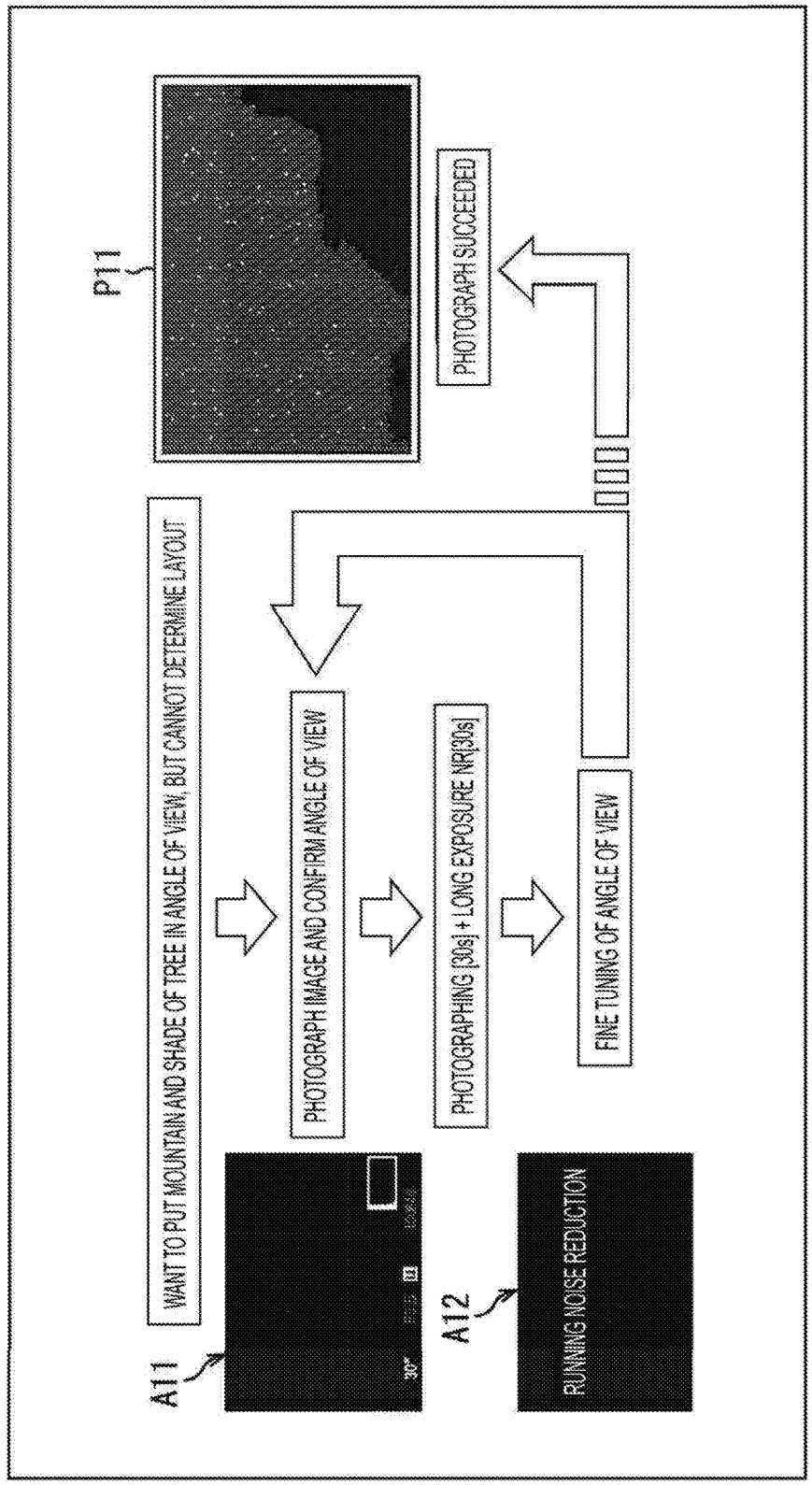
FIG. 4 is an explanatory diagram for explaining adjustment of an angle of view of an image to be photographed.

For example, it is assumed that the user wants to photograph a photographed image P11 as illustrated in FIG. 4 by the astronomical photographing. An object of the photographed image P11 is the sky, with trees captured as part of the surrounding landscape in the lower part of the photographed image P11.

In such astronomical photographing, if the imaging apparatus photographs the live view image with the same exposure time as the exposure time of the normal photographing, the user needs to repeat operations illustrated in FIG. 4. Namely, the live view image displayed on the image display unit is very dark, with red noise outstanding against the image, as indicated by an arrow A11, such that the surrounding landscape or the like cannot be recognized. The user wants to put mountains and shade of trees in the angle of view as a landscape, but cannot determine the layout because the user cannot recognize such a landscape in the live view image.

In this case, the user has to photograph the image to be photographed with the imaging apparatus and adjust the angle of view by seeing the obtained photographed image. Now, it is assumed that the exposure time of photographing the image to be photographed is 30 seconds and long noise reduction processing for 30 seconds is performed.

The long noise reduction processing aims to remove large noise that becomes large when the exposure time increases. In the long noise reduction processing, images for removing noise are accumulated for the same time period as a time period of photographing the image to be photographed in a state in which a mechanical shutter is closed or the imaging device is optically shielded by liquid crystal or the like to remove the photographed image. Specifically, a pixel value of a pixel of the image obtained for removal of noise in the light-shielded state is subtracted from a pixel value of a pixel of the photographed image at individual pixel positions to remove the noise.

When the long noise reduction processing described above is performed, the image to be photographed is photographed with exposure time of 30 seconds, followed by further noise reduction processing for 30 seconds. During this time period, text such as "Running Noise Reduction" is displayed, for example, on the image display unit, as indicated by an arrow A12, but the photographed image is not displayed. Thus, the user cannot confirm the photographed image until the noise reduction processing is finished.

Once the exposure and the noise reduction processing during photographing are finished, the photographed image is displayed on the image display unit, such that the user finely adjusts the angle of view by seeing the photographed image and proceeds to another photographing. When the photographing is repeated several times to obtain a final photographed image P11 having a satisfying angle of view or the like, the photographing is finished.

Thus, the exposure time becomes insufficient relative to the amount of light of the surroundings (object) and thus the angle of view cannot be adjusted in the live view, if it is tried to perform the astronomical photographing with the same settings as the settings for the normal photographing, such that the photographing with long exposure needs to be performed repeatedly for the adjustment of the angle of view. Such work is burdensome for the user.

In the imaging apparatus 11, therefore, sufficiently long exposure time is set for the live view image during the astronomical photographing in order to prioritize the quality of the live view image. Namely, the live view image is photographed at such a shutter speed as to allow photographing of the image having an image quality sufficient for live viewing. In this case, the exposure time of the live view image may vary from 30 seconds to as long as several minutes.

In the astronomical photographing, since the sky which is the main object can be regarded as being stationary, the immediate responsiveness of the live view is not important. Instead, the imaging apparatus 11 prioritize the angle of view confirmation property to the immediate responsiveness in setting the shutter speed (exposure time) of the live view image.

In the present specification, the shutter speed of the live view image does not represent the shutter speed of each frame of the live view image, but corresponds to a reciprocal of the frame rate of the live view image. For example, a shutter speed of 30 seconds of the live view image corresponds to a frame rate of about 0.03 fps for the live view image.

Thus, the angle of view can be adjusted in the live view by delaying (increasing the exposure time) the shutter speed of the live view image during the astronomical photographing (photographing in the dark place) compared to the normal photographing, although the updating cycle of the live view image is delayed. Namely, although the updating cycle of the image is delayed, the live view image having a sufficient image quality can always be displayed to allow the user to adjust the angle of view by seeing the live view image.

Specifically, the imaging apparatus 11 determines whether the astronomical photographing is performed using one or both of the external detected information and the internal detected information. According to a determination result, the settings of the driving method or the control value of the imaging device 22 of the imaging apparatus 11 are changed automatically.

For example, the external information detecting unit 30 detects, as the external detected information, information indicating whether the imaging apparatus 11 is fixed on the tripod, or information indicating an elevation angle, that is, to what extent the imaging apparatus 11 is inclined along the elevation angle or toward the sky.

In detecting whether the imaging apparatus 11 is fixed on the tripod, a sensor, for example, provided in the external information detecting unit 30 detects that the imaging apparatus 11 does not move or remains stationary to determine that the imaging apparatus 11 is fixed on the tripod.

For example, a sensor that electrically or physically detects connection between the tripod and the imaging apparatus 11 when the imaging apparatus 11 is fixed on the tripod may be provided in the external information detecting unit 30. According to the output of the sensor, the state in which the imaging apparatus 11 is fixed on the tripod is detected.

Alternatively, it may also be possible to detect the state in which the imaging apparatus 11 is fixed on the tripod by the external information detecting unit 30 communicating with the tripod when the imaging apparatus 11 is fixed on the tripod. It may also be possible to detect the fixing on the tripod by the user inputting the fact of being fixed on the tripod by operating the operation input unit 29.

The external information detecting unit 30 may also detect, as the external detected information, the elevation angle of the imaging apparatus 11 obtained from the output of the sensor provided in the external information detecting unit 30. For example, when the imaging apparatus 11 is fixed to face the sky (upward), the elevation angle of the imaging apparatus 11 is equal to or larger than a predetermined angle, such that the elevation angle may also be used to determine the astronomical photographing.

The elevation angle of the imaging apparatus 11 is also detected herein as the external detected information, in addition to the fact that the imaging apparatus 11 is fixed on the tripod, because the astronomical photographing is described herein as an example of photographing in the dark place. However, the tripod is also used often for photographing in the extremely dark place, other than in the astronomical photographing. By detecting the fixing on the tripod as the external detected information, the photographing in the dark place can be determined using the external detected information or the internal detected information as needed.

Meanwhile, the internal information detecting unit 52 detects, as the internal detected information, information about the photographed image, such as a shutter speed (exposure time) of the photographed image, or a statistical value obtained from the live view image. The information about the photographed image includes, for example, information obtained from the information during photographing of the photographed image or the live view image.

More specifically, the internal information detecting unit 52 detects the shutter speed of the photographed image as the internal detected information. The internal information detecting unit 52 also detects a degree of darkness of the entire live view image or a degree of likelihood of night scene (likelihood of an astronomical image) of the live view image as the internal detected information.

The degree of darkness of the entire live view image is calculated according to the pixel value of each pixel of the live view image, and may be calculated from, for example, an average pixel value of each pixel. Alternatively, a ratio of a dark area of the live view image to the entire area of the live view image may be provided as the degree of darkness of the entire live view image.

The degree of likelihood of the night scene is calculated based on, for example, the brightness (darkness) of the entire live view image, or an analytic result of the layout of the live view image. For example, the degree of likelihood of the night scene (likelihood of the astronomical image) is set to be higher when the entire live view image is dark and few edge components exist from the center to the upper area of the live view image. A technology for determining the degree of likelihood of the night scene is widely known, and any technology may be used so long as the degree of likelihood of the night scene can be calculated.

The photographing settings changing unit 53 determines whether the astronomical photographing is performed based on the external detected information obtained by the external information detecting unit 30 and the internal detected information obtained by the internal information detecting unit 52.

For example, one or both of the external detected information and the internal detected information may be used to determine the astronomical photographing.

One example of determining the astronomical photographing is, for example, when the shutter speed of the photographed image detected as the internal detected information is at least 30 seconds, the degree of likelihood of the night scene detected as the internal detected information is equal to or larger than a threshold value, and the information indicating that the imaging apparatus 11 is fixed on the tripod is obtained as the external detected information.

Thus, at least the internal detected information or the external detected information may be used to determine whether the astronomical photographing is performed.

For example, the astronomical photographing may be determined when the shutter speed of the photographed image detected as the internal detected information is equal to or more than predetermined seconds, or the elevation angle of the imaging apparatus 11 detected as the external detected information is equal to or larger than a predetermined angle.

Alternatively, the astronomical photographing may be determined when multiple pieces of external and internal detected information are used to determine the astronomical photographing for each piece of information, and all determination results of such information indicate the astronomical photographing, or when the determination result of being the astronomical photographing is obtained for the predetermined number of pieces of information or more.

Further, the astronomical photographing may be determined by the photographing settings changing unit 53 based on the external detected information input by the user operating the operation input unit 29 to input information indicating the fact that the photographing is the astronomical photographing as the external detected information. In this case, the image display unit 27 or the EVF 26 displays text information that urges the user to enter whether the astronomical photographing is performed, or a confirmation screen including a button or the like used to input that the astronomical photographing is performed.

Alternatively, the astronomical photographing may be determined when the degree of likelihood of the astronomical photographing is obtained by weight-adding calculation of several pieces of internal detected information and external detected information, and the obtained degree is equal to or larger than a threshold value.

When the photographing of the photographed image is not determined to be the astronomical photographing, the photographing settings changing unit 53 sets the driving method or the control values of the imaging device 22 of the imaging apparatus 11 to prioritize-immediate-responsiveness setting in which the immediate responsiveness of the live view is prioritized as in the normal photographing.

In the prioritize-immediate-responsiveness setting, the exposure time of the imaging device 22 during the photographing of the live view image is set to a predetermined value of Lr, that is, an upper limit value of the shutter speed of the imaging lens 21 is set to Lr=0.2 seconds, for example. Thus, in the prioritize-immediate-responsiveness setting, the exposure time of the live view image is not more than the upper limit value Lr in the prioritize-immediate-responsiveness setting, even when the photographing surroundings are dark during photographing. The immediate responsiveness is secured, and the moving object can be photographed without blur.

Further, for example, in the prioritize-immediate-responsiveness setting, a driving method of reading the live view image of a predetermined size, which is obtained by thinning reading of the live view image photographed by the imaging device 22, is chosen as the driving method of the imaging device 22 during the photographing of the live view image.

Specifically, the imaging device 22 performs thinning reading to read pixel data only from a part of the entire pixels, and outputs a predetermined sized live view image formed by the pixel data of each pixel obtained by the thinning reading to the AFE unit 23.

Further, in the prioritize-immediate-responsiveness setting, filtering processing, for example, using an c filter that further emphasizes the responsiveness may be chosen as the noise reduction processing performed on the live view image by the image processing unit 24 during the photographing of the live view image.

In contrast, when the photographed image is photographed by the astronomical photographing, the photographing settings changing unit 53 sets the driving method or the control value of the imaging device 22 of the imaging apparatus 11 to a prioritize-angle-of-view-confirmation-ability setting to ensure confirmation of the angle of view, even by sacrificing the immediate responsiveness of the live view.

Specifically, in the prioritize-angle-of-view-confirmation-ability setting, the exposure time of the imaging device 22 during the photographing of the live view image is set to be longer than the upper limit value Lr, such as the upper limit value of the shutter speed of the imaging lens 21 being set to Lv=about 1 to 5 seconds.

Thus, the confirmation property of the angle of view is prioritized to the immediate responsiveness of the live view in the prioritize-angle-of-view-confirmation-ability setting, in order to obtain the live view image having a sufficient image quality for adjusting the angle of view. As a result, a substantially long exposure time is secured as the exposure time of the live view image, compared to the prioritize-immediate-responsiveness setting. Since the shutter speed (exposure time) for obtaining the live view image having an appropriate image quality largely depends on the photographing environment, the upper limit value Lv of the shutter speed of the live view image in the prioritize-angle-of-view-confirmation-ability setting may be determined according to the photographing environment.

Further, in the prioritize-angle-of-view-confirmation-ability setting, a driving method, in which the predetermined sized live view image is output by adding pixels in the imaging device 22 during reading of the live view image photographed by the imaging device 22, is chosen as the driving method of the imaging device 22 during the photographing of the live view image.

Specifically, for example, the pixel data is read from the entire pixels of the imaging device 22, and pixel data of multiple pixels disposed adjacent to each other of the pixel data having been read are mixed (added) together in a register or the like disposed on a transfer path during transfer to an output stage from each pixel of the imaging device 22. Namely, the pixel data of multiple pixels of the imaging device 22 arranged adjacent to each other are mixed together to convert the size of the image, and the predetermined sized live view image has resulted and is output to the AFE unit 23 from the imaging device 22.

To convert the size of the image, an image having a better image quality can be obtained by reducing the size of the image by adding pixels, than by simply thinning the pixels by thinning reading during the reading of the image. In the prioritize-angle-of-view-confirmation-ability setting, the driving method in which the size conversion is performed by adding pixels in the imaging device 22, is chosen as the driving method of the imaging device 22. Thus, the angle of view can be confirmed in a fine live view image having a high image quality or a better visibility.

Although the example of changing the exposure time of the imaging device 22 or the driving method of the imaging device 22 during the reading of the live view image according to whether the astronomical photographing is performed has been described, that is, the example of changing the image size changing algorithm of the live view image has been described, any other driving method may be changed.

Further, in the prioritize-angle-of-view-ability setting, filtering processing, for example, using a bilateral filter that further emphasizes the noise reduction effect may be chosen as the noise reduction processing performed on the live view image by the image processing unit 24 during the photographing of the live view image.

In the noise reduction processing, a higher noise reduction effect can be obtained with the bilateral filter than with the c filter. In other words, a better image having a higher image quality can be obtained.

Using the bilateral filter, however, may increase the processing time of the filtering processing than using the c filter. However, when the astronomical photographing is performed and the prioritize-angle-of-view-confirmation-ability setting is chosen, no delay occurs by the filtering processing, because the upper limit value of the shutter speed of the live view image is set to be longer than the upper limit value of the normal prioritize-immediate-responsiveness setting.

Although the example of changing the algorithm used in the noise reduction processing as the image processing executed by the image processing unit 24 according to whether the astronomical photographing is performed, other parameters of the filtering processing or the algorithm for other image processing may also be changed. For example, a tap position or the number of taps of the filtering processing may be considered as the parameters for the filtering processing.

In addition, different types of size conversion processing may be chosen (set), for example, as the image processing executed by the Image processing unit 24 according to whether the astronomical photographing is performed.

Specifically, in the prioritize-immediate-responsiveness setting, for example, the image processing unit 24 performs such a size conversion processing that several pixels of the live view image read by the imaging device 22 are trashed (thinned), and an image formed by the remaining pixels having a predetermined size is used as the live view image after the size conversion processing.

In contrast, in the prioritize-angle-of-view-confirmation-ability setting, for example, the image processing unit 24 performs such a filtering processing that the weight of the pixel values of several pixels are added to the live view image read by the imaging device 22, and new pixel values of new pixels are calculated to convert the size of the live view image.

Generally speaking, to obtain the predetermined sized image, a better image having a better quality can be obtained by the weight addition to reduce the image size than by the simple thinning to trash several pixels. When the weight addition is performed, however, the processing time becomes longer than the simple thinning processing. However, when the astronomical photographing is performed and the prioritize-angle-of-view-confirmation-ability setting is chosen, no delay occurs in updating the display of the live view image even when the weight addition is performed, because the upper limit of the shutter speed (exposure time) of the live view image is set to be longer than the upper limit value of the normal prioritize-immediate-responsiveness setting.

Namely, a frame interval of the live view image becomes longer in the astronomical photographing than in the normal photographing, such that processing algorithm involving a larger calculation amount and longer processing time can be adopted in various types of image processing. Thus, the angle of view can be confirmed in a fine live view image having a high image quality or a better visibility.

It may be possible to perform the size conversion of the live view image only in the image processing unit 24 and not in the imaging device 22, when the size conversion of the live view image is performed in the image processing unit 24.

It may also be possible to perform further processing for converting the size of the live view image in the image processing unit 24, after the conversion of the size of the live view image is performed in the imaging device 22, to obtain a final live view image of a desired size. In such a case, a combination of the driving method of the imaging device 22 and the size conversion processing of the image processing unit 24 is appropriately chosen (set) according to whether the setting is the prioritize-immediate-responsiveness setting or the prioritize-angle-of-view-confirmation-ability setting.

When the driving method of the imaging device 22 and the size conversion processing of the image processing unit 24 are combined to convert the size of the live view image, it may be possible to prohibit the conversion of the size in the imaging device 22 or the image processing unit 24 at least in the prioritize-immediate-responsiveness setting or in the prioritize-angle-of-view-confirmation-ability setting. Further, it may also be possible to set different reduction ratios of the live view image in the size conversion of the imaging device 22 and the image processing unit 24 between the prioritize-immediate-responsiveness setting and the prioritize-angle-of-view-confirmation-ability setting. For example, the quality of the image decreases as the size of the live view image output from the imaging device 22 becomes smaller, but the processing time of the subsequent image processing becomes shorter. When the reduction ratio of the size conversion processing in the image processing unit 24 is different between the prioritize-immediate-responsiveness setting and the prioritize-angle-of-view-confirmation-ability setting, the reduction ratio (thinning amount) of the size conversion processing in the image processing unit 24 may be set to be lower in the prioritize-immediate-responsiveness setting than in the prioritize-angle-of-view-confirmation-ability setting. In this case, the reduction ratio of the size conversion is determined in each of the imaging device 22 and the image processing unit 24, so as to obtain the final live view image of the predetermined size.

As described above, a more object-matching for photographing and more suitable live view image can be obtained by changing the upper limit value of the shutter speed of the live view image according to whether the astronomical photographing is performed.

In particular, the upper limit value of the shutter speed of the live view image is set to be larger (longer) than in the normal photographing for the astronomical photographing, the necessary exposure time can be secured and the live view image having the image quality sufficient for the adjustment of the angle of view can be obtained.

A live view image having an even better image quality and a higher visibility can be obtained by changing the driving method of the imaging device 22 and the image processing of the image processing unit 24, as well as by setting the shutter speed of the live view image, according to whether the astronomical photographing is performed.

Thus, the user can adjust the angle of view more easily and quickly without any special operation. Since the confirmation of the angle of view by the live view image can be done easily during the astronomical photographing using the live view, the user can execute photographing without stress and thereby increase photographing opportunities.

Meanwhile, the upper limit value of the shutter speed of the live view image is set to a relatively small (short) value during the photographing other than the astronomical photographing, such as the photographing in the dark place, such that the immediate responsiveness of the live view can be secured and the decrease of operability is prevented during photographing of the moving object or the like.

The present technology can be applied to portable telephones or the like, other than the digital still cameras described above, and provides a large benefit for users who do not have sufficient knowledge of cameras.

<Description of a Photographing Process>

Figure 5:
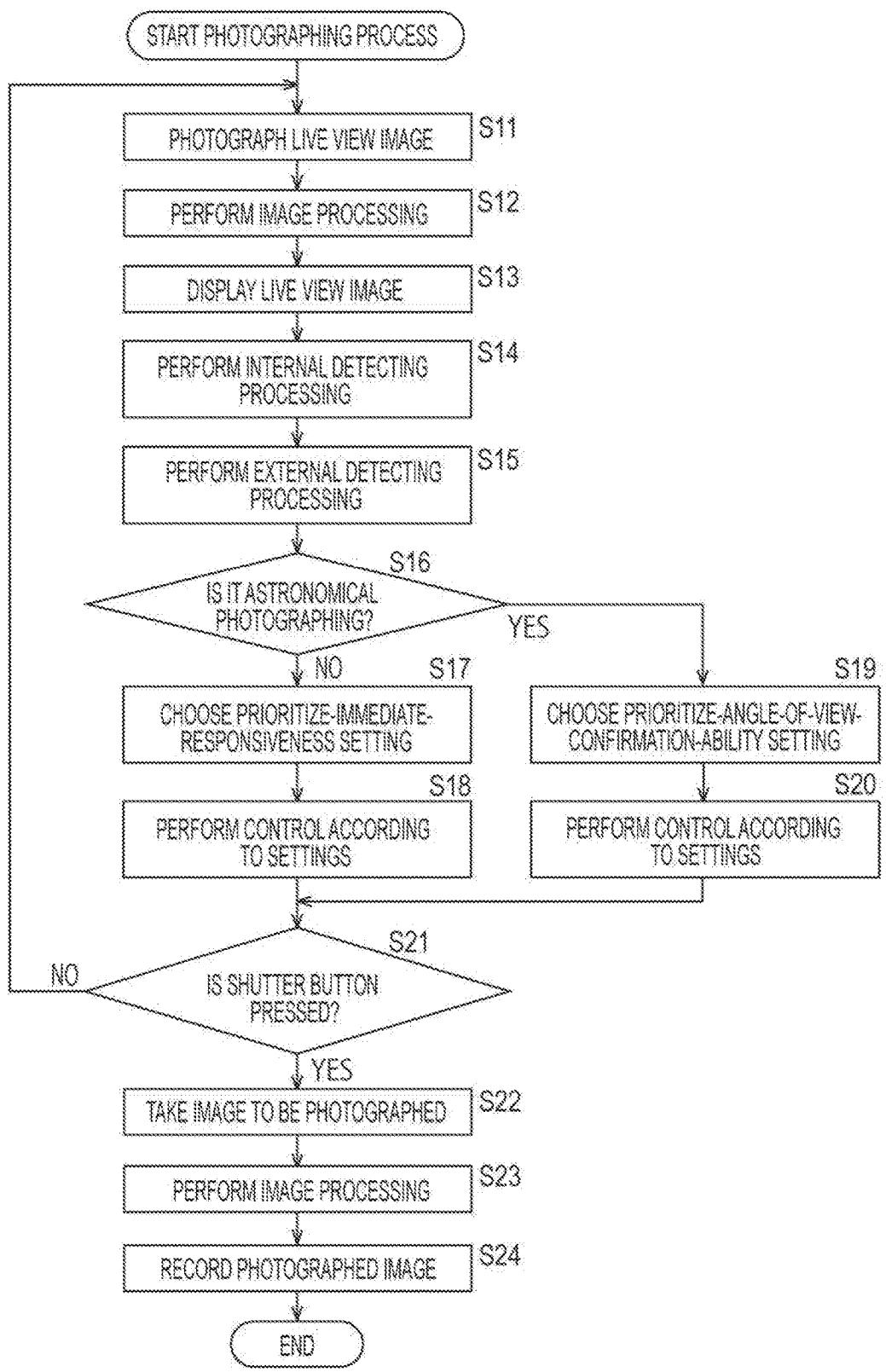
FIG. 5 is a flowchart for explaining photographing process.

Next, the process flow of processing executed by the imaging apparatus 11 described above will be described. The imaging apparatus 11 is operated by the user and takes an image to be photographed by executing photographing processing upon receiving an instruction to start a photographing operation of the image to be photographed. The photographing processing by the imaging apparatus 11 will be described below by referring to the flowchart of FIG. 5.

In step S11, the imaging device 22 photographs a live view image by receiving incident light from an object through the imaging lens 21, and performs photoelectric conversion of the incident light to obtain a live view image which is then supplied to the image processing unit 24 via the AFE unit 23.

In step S12, the image processing unit 24 performs various types of image processing, such as demosaic processing or noise reduction processing, on the live view image supplied from the imaging device 22, and supplies an obtained live view image to the control unit 25.

In step S13, the display control unit 51 of the control unit 25 supplies the live view image supplied from the image processing unit 24 to the EVF 26 or the image display unit 27 to display the live view image. The user confirms the displayed live view image and adjusts the angle of view by moving the imaging apparatus 11 to change a photographing direction or a zoom magnification, as appropriate.

In step S14, the internal information detecting unit 52 performs internal detecting processing to detect the internal detected information, and supplies obtained internal detected information to the photographing settings changing unit 53.

For example, the internal information detecting unit 52 uses the live view image, as needed, to detect, as the internal detected information, the shutter speed, the degree of darkness of the entire live view image, the degree of likelihood of the night scene of the live view image, and the like, of the photographed image, which have set previously by the user or in the program. The internal detected information may include a piece of information or multiple pieces of information.

In step S15, the external information detecting unit 30 performs the external detecting processing to detect the external detected information, and supplies obtained external detected information to the photographing settings changing unit 53 of the control unit 25. For example, the external information detecting unit 30 detects whether the imaging apparatus 11 is fixed on the tripod, or detects an elevation angle of the imaging apparatus 11 as the external detected information. The processing of step S14 may be executed after the processing of step S15 is executed, or the processing of steps S14 and S15 may be executed in parallel.

In step S16, the photographing settings changing unit 53 determines whether the photographing to be performed on the image is the astronomical photographing, based on at least the internal detected information supplied from the internal information detecting unit 52 or the external detected information supplied from the external information detecting unit 30.

For example, the astronomical photographing is determined if the shutter speed of the image being photographed is at least 30 seconds and the degree of likelihood of the night scene is equal to or larger than a threshold value, and the imaging apparatus 11 is fixed on the tripod.

When the astronomical photographing is determined based on the external detected information or the internal detected information, the image display unit 27 or the EVF 26 may display a confirmation screen to urge the user to operate the operation input unit 29 to input whether or not the astronomical photographing is performed. In this case, the astronomical photographing is determined when the user inputs that the astronomical photographing is performed.

In step S16, if the astronomical photographing is not determined, that is, if normal photographing is determined instead of the astronomical photographing, the photographing settings changing unit 53 sets the driving method or the control value of the imaging device 22 of the imaging apparatus 11 in step S17 to the prioritize-immediate-responsiveness setting.

Specifically, the photographing settings changing unit 53 sets the upper limit value of the shutter speed of the live view image to Lr as the prioritize-immediate-responsiveness setting.

The photographing settings changing unit 53 also sets, as the prioritize-immediate-responsiveness setting, the driving method of the imaging device 22 during, for example, reading of the live view image, to the method in which thinning reading processing is performed. The photographing settings changing unit 53 also sets the filtering processing using the c filter to be executed, for example, as the noise reduction processing as the prioritize-immediate-responsiveness setting.

In step S18, the control unit 25 controls photographing according to the prioritize-immediate-responsiveness setting determined in the processing of step S17.

Specifically, the photographing settings changing unit 53 of the control unit 25 calculates, for example, a shutter speed of the live view image, with the upper limit value being Lr, based on a transmittance of the imaging lens 21, brightness of the photographing environment, an ISO sensitivity, or the like. At this time, if the calculated shutter speed is longer than the upper limit value of Lr, the upper limit value Lr is regarded as the final shutter speed.

The control unit 25 controls the operations of the lens driver 31 or the imaging device 22 based on the calculated shutter speed of the live view image.

Once the shutter speed of the live view image is determined as described above, the determined shutter speed (exposure time) is used to photograph the live view image next time the processing of step S11 is executed.

The control unit 25 controls the imaging device 22 to read the live view image by the driving method determined in step S17, such as the driving method of executing thinning reading. Accordingly, next time the processing of step S11 is executed, pixel data is read only from a part of the pixels of the imaging device 22, and a resulting image obtained is output to the AFE unit 23 as the live view image.

The control unit 25 also instructs the image processing unit 24 to execute processing determined as the noise reduction processing in step S17, such as the filtering processing using the c filter. Accordingly, next time the processing of step S12 is executed, the filtering processing using the c filter is executed on the live view image by the image processing unit 24.

Thus, the control is executed corresponding to the prioritize-immediate-responsiveness setting, and the process proceeds to step S21.

If the astronomical photographing is determined in step S16, the photographing settings changing unit 53 sets the driving method or the control value of the imaging device 22 of the imaging apparatus 11 to the prioritize-angle-of-view-confirmation-ability setting in step S19.

Specifically, the photographing settings changing unit 53 sets, as the prioritize-angle-of-view-confirmation-ability setting, the upper limit value of the shutter speed of the live view image to Lv which is larger (longer) than the upper limit value Lr in the prioritize-immediate-responsiveness setting. Namely, the photographing settings changing unit 53 sets the exposure time of the live view image by setting the upper limit value of the shutter speed of the live view image to Lv.

The photographing settings changing unit 53 sets, as the prioritize-angle-of-view-confirmation-ability setting, the driving method of the imaging device 22 for reading the live view images and the noise reduction processing performed on the live view image.

For example, the photographing settings changing unit 53 sets the driving method of the imaging device 22 for reading the live view image to the driving method in which the size conversion by adding pixels in the imaging device 22 is performed. The photographing settings changing unit 53 further sets the filtering processing using, for example, the bilateral filter to be executed as the noise reduction processing.

In step S20, the control unit 25 executes photographing control determined in the processing of step S19 corresponding to the prioritize-angle-of-view-confirmation-ability setting.

Specifically, the photographing settings changing unit 53 of the control unit 25 calculates, for example, the shutter speed of the live view image, with the upper limit value being Lv, based on the transmittance of the imaging lens 21, the brightness of the photographing environment, the ISO sensitivity, or the like. At this time, if the calculated shutter speed is longer than the upper limit value Lv, the upper limit value Lv is regarded as the final shutter speed.

The control unit 25 controls the operations of the lens driver 31 or the imaging device 22 based on the calculated shutter speed of the live view image.

Once the shutter speed of the live view image is determined as described above, the determined shutter speed (exposure time) is used to photograph the live view image next time the processing of step S11 is executed.

The control unit 25 controls the imaging device 22 to read the live view image by the driving method determined in step S19, such as the driving method of executing the size conversion by adding pixels. Accordingly, next time the processing of step S11 is executed, the pixel data read from the pixels are mixed together in a register or the like in the imaging device 22, and a resulting image obtained having a predetermined size is output to the AFE unit 23 as the live view image.

The control unit 25 also instructs the image processing unit 24 to execute processing determined as the noise reduction processing in step S19, such as the filtering processing using the bilateral filter. Accordingly, next time the processing of step S12 is executed, the filtering processing using the bilateral filter is executed on the live view image by the image processing unit 24.

Thus, the control is executed corresponding to the prioritize-angle-of-view-confirmation-ability setting, and the process proceeds to step S21.

When the control corresponding to the settings in step S18 or step S20, the control unit 25 determines whether the shutter button is pressed in step S21.

If the user presses the shutter button as the operation input unit 29 and the signal corresponding to the operation of the shutter button is supplied from the operation input unit 29 to the control unit 25, the pressing of the shutter button is determined.

If the pressing of the shutter button is not determined step S21, indicating that the user has not adjusted, for example, the angle of view and the condition for photographing the image is not ready, then the process returns to step S11 and the above-described sequential processing is repeated. Namely, a frame located next to the live view image is taken and displayed as the live view image.

In contrast, if it is determined in step S21 that the shutter button is pressed, the imaging device 22 takes the image to be photographed in step S22.

Namely, the control unit 25 controls the lens driver 31 or the imaging device 22 to take the image to be photographed at a determined shutter speed (exposure time) or an aperture. The imaging device 22 moves in response to the instruction from the control unit 25 to takes the image to be photographed by photoelectrically converting incident light from the object through the imaging lens 21.

The imaging device 22 supplies the obtained photographed image to the image processing unit 24 via the AFE unit 23.

In step S23, the image processing unit 24 performs various types of image processing, such as the demosaic processing or the noise reduction processing, on the photographed image supplied from the imaging device 22 and supplies an obtained photographed image to the control unit 25. Predetermined noise reduction processing, such as the filtering processing using the bilateral filter, is executed herein on the photographed image.

In step S24, the control unit 25 supplies the photographed image supplied from the image processing unit 24 to the recording unit 28 for a record. The photographing processing is thus finished. The photographed image may be supplied to and displayed on the EVF 26 or the image display unit 27, as needed.

Thus, the imaging apparatus 11 detects the internal detected information and the external detected information and, based on such information, determines whether the astronomical photographing is performed. According to the determination result of the astronomical photographing, the imaging apparatus 11 changes, for example, the setting of the shutter speed or the like of the live view image.

In particular, the upper limit value of the shutter speed of the live view image can be set to be larger in the astronomical photographing than in the normal photographing to obtain the live view image having the image quality sufficient for the adjustment of the angle of view. The adjustment of the angle of view can, therefore, be performed more easily and quickly. In the astronomical photographing, the driving method of the imaging device 22 or the image processing in the image processing unit 24 can also be changed, such that the live view image having an even better image quality can be obtained.

The above-described sequential processing may be performed by hardware or may be performed by software. When the sequential processing is to be performed by software, the program that forms the software is installed in a computer. The computer may herein include a computer that is incorporated into special-purpose hardware or a general-purpose computer that can execute various kinds of functions by installing various types of programs.

Figure 6:
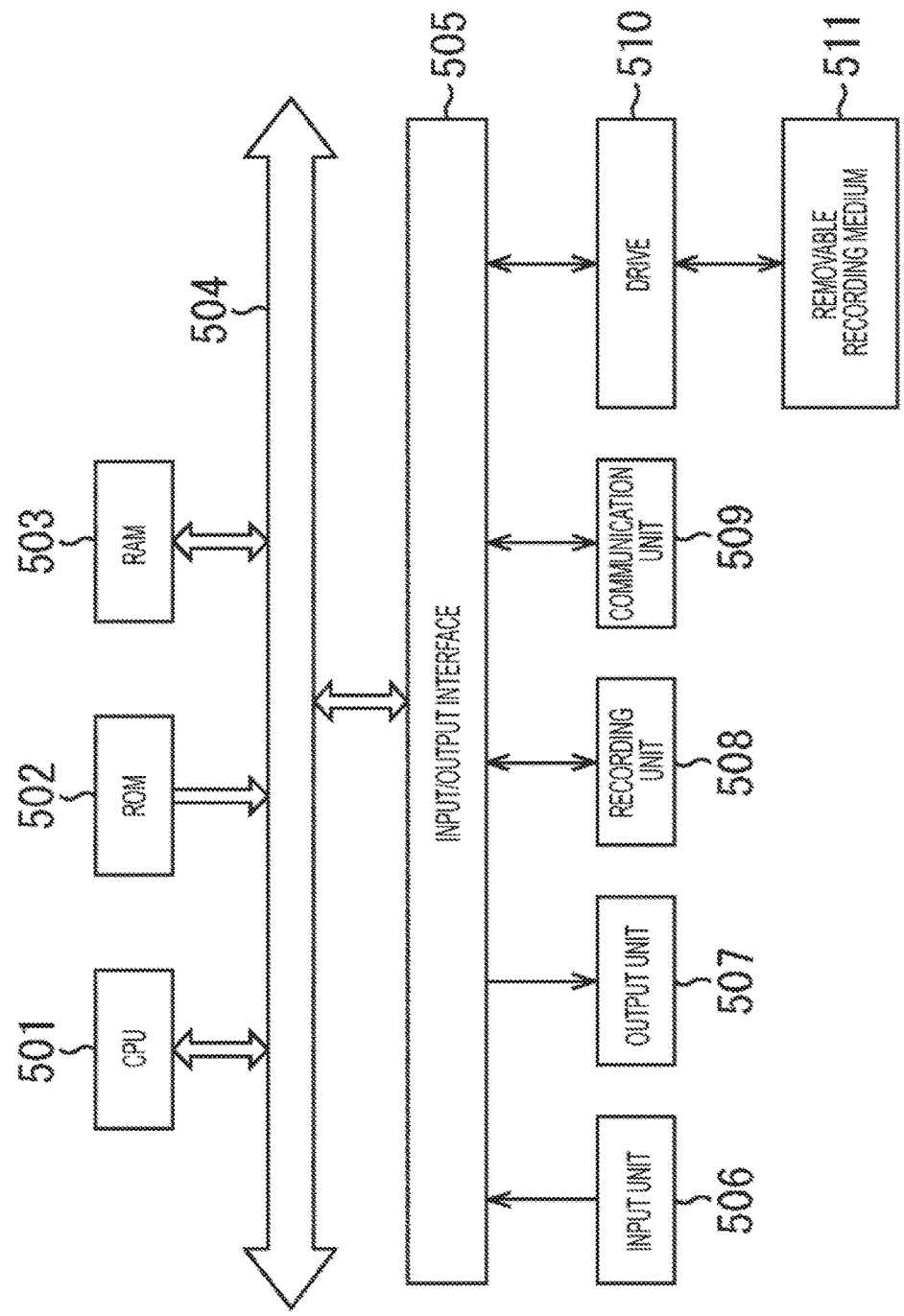
FIG. 6 is an example structure of a computer.

FIG. 6 is a block diagram illustrated as an example structure of the computer hardware executing the above-described sequential processing by the program.

In the computer, a central processing unit (CPU) 501, a read only memory (ROM) 502, a random access memory (RAM) 503 are connected mutually via a bus 504.

An input/output interface 505 is further connected to the bus 504. An input unit 506, an output unit 507, a recording unit 508, a communication unit 509, and a drive 510 are connected to the input/output interface 505.

The input unit 506 is formed by a keyboard, a mouse, a microphone, an imaging device, and the like. The output unit 507 is formed by a display, a speaker, and the like. The recording unit 508 is formed by a hard disk, a nonvolatile memory, or the like. The communication unit 509 is formed by a network interface or the like. The drive 510 drives a removable recording medium 511, such as a magnetic disk, an optical disc, a magneto-optical disk, or a semiconductor memory.

In the computer having the above-described structure, the CPU 501 loads a program recorded in the recording unit 508 into the RAM 503 via the input/output interface 505 and the bus 504, for example, and executes the program, such that the above-described sequential processing is performed.

The program executed by the computer (CPU 501) can be recorded in the removable recording medium 511 and provided as a packaged medium, for example. Alternatively, the program can be provided via a wired or wireless transmission medium, such as a local area network, the Internet, or digital satellite broadcasting.

In the computer, the program can be installed in the recording unit 508 via the input/output interface 505 by mounting the removable recording medium 511 on the drive 510. The program can also be received by the communication unit 509 via a wired or wireless transmission medium, and can be installed in the recording unit 508. Alternatively, the program may be installed in advance in the ROM 502 or the recording unit 508.

The program to be executed by the computer may be a program for performing sequential processing in chronological order in accordance with the sequence described in this specification, or may be a program for performing the sequential processing in parallel or performing the sequential processing as needed, such as when there is a call.

It should be noted that the embodiment of the present technology is not limited to the above-described embodiment, and various other modifications may be made without departing from the scope of the present technology.

For example, the present technology can be embodied in a cloud computing structure in which one function is shared among devices via a network, and processing is performed by the devices cooperating with one another.

The individual steps described by referring to the flowchart described above can be performed by one device or can be shared among more than one device.

In a case where more than one processing is included in one step, the processing included in the step can be performed by one device or can be shared among more than one device.

The advantageous effects described in this specification are merely examples, and the advantageous effects of the present technology are not limited to those described.

Further, the present technology may take the following forms.

(1) An imaging apparatus including a setting unit configured to set exposure time of a live view image to be longer in photographing in a dark place than in other types of photographing.

(2) The imaging apparatus according to (1) in which the exposure time of an image to be photographed is set to be longer than predetermined exposure time in the photographing in the dark place.

(3) The imaging apparatus according to (1) or (2) in which, in the case of the photographing in the dark place, the setting unit sets an upper limit value of the exposure time of the live view image to be larger than the exposure time of the other types of photographing.

(4) The imaging apparatus according to any one of (1) to (3) in which, in the case of the photographing in the dark place, the setting unit sets a driving method of an imaging device different from a driving method of the other types of photographing.

(5) The imaging apparatus according to any one of (1) to (4) in which, in the case of the photographing in the dark place, the setting unit sets image processing different from image processing for the other types of photographing.

(6) The imaging apparatus according to (5) in which the image processing is size conversion processing.

(7) The imaging apparatus according to (5), in which the image processing is noise reduction processing.

(8) The imaging apparatus according to any one of (1) to (7) further including a control unit configured to determine whether the photographing in the dark place is performed.

(9) The imaging apparatus according to (8) in which the control unit determines whether the photographing in the dark place is performed according to exposure time of a photographed image.

(10) The imaging apparatus according to (8) or (9) in which the control unit determines whether the photographing in the dark place is performed according to whether the imaging apparatus is fixed on a tripod.

(11) The imaging apparatus according to (8) or (9) in which the control unit determines whether the photographing in the dark place is performed according to an elevation angle of the imaging apparatus.

(12) The imaging apparatus according to any one of (8) to (11) in which the control unit determines whether the photographing in the dark place is performed according to a degree of darkness of the entire live view image.

(13) The imaging apparatus according to any one of (8) to (11) in which the control unit determines whether the photographing in the dark place is performed according to a degree of likelihood of night scene of the live view image.

(14) The imaging apparatus according to any one of (1) to (13) in which the photographing in the dark place is astronomical photographing.

(15) A photographing method including a step of setting exposure time of a live view image to be longer in photographing in a dark place than in other types of photographing.

(16) A program configured to cause a computer to execute processing including a step of setting exposure time of a live view image to be longer in photographing in a dark place than in other types of photographing.

REFERENCE SIGNS LIST

11 Imaging apparatus
21 Imaging lens
22 Imaging device
24 Image processing unit
25 Control unit
26 EVF
27 Image display unit
30 External information detecting unit
51 Display control unit
52 Internal information detecting unit
53 Photographing settings changing unit

The invention claimed is:

1. An imaging apparatus, comprising:
at least one processor configured to:
set a first exposure time of a live view image of a scene in a first photographing mode,
wherein the first photographing mode is set to photograph the live view image of the scene, displayed on an electronic view finder (EVF), at determined time intervals;
set a second exposure time to photograph an image of the scene, after display of the live view image photographed at the first exposure time, based on a user operation,
wherein the user operation includes adjustment of an angle of view of the scene, and
wherein the first exposure time is longer than the second exposure time; and
limit an exposure time up to a specific exposure time to photograph the live view image of the scene in a second photographing mode,
wherein the limited exposure time is shorter than the first exposure time.

2. The imaging apparatus according to claim 1,
wherein the first exposure time of the live view image is longer than a threshold exposure time in the first photographing mode, and
wherein the first photographing mode represents photography in a dark place.

3. The imaging apparatus according to claim 2,
wherein the at least one processor is further configured to set an upper limit value of the first exposure time of the live view image in the first photographing mode,
wherein the upper limit value is larger than a third exposure time of the live view image in the second photographing mode, and
wherein the second photographing mode is different from the first photographing mode.

4. The imaging apparatus according to claim 3,
wherein the at least one processor is further configured to set a first driving method of an imaging device, in the imaging apparatus, in the first photographing mode, and
wherein the first driving method is different from a second driving method in the second photographing mode.

5. The imaging apparatus according to claim 3,
wherein the at least one processor is further configured to set a first image process in the first photographing mode, and
wherein the first image process is different from a second image process associated with the second photographing mode.

6. The imaging apparatus according to claim 5,
wherein each of the first image process and the second image process is a size conversion process.

7. The imaging apparatus according to claim 5,
wherein each of the first image process and the second image process is a noise reduction process.

8. The imaging apparatus according to claim 3, wherein the first exposure time of the live view image is larger than the third exposure time of the live view image.

9. The imaging apparatus according to claim 2, wherein the first photographing mode represents astronomical photographing process.

10. The imaging apparatus according to claim 1,
wherein the at least one processor is further configured to determine the first photographing mode, and
wherein the first photographing mode represents photography in a dark place.

11. The imaging apparatus according to claim 10, wherein the at least one processor is further configured to determine the first photographing mode based on a third exposure time of a photographed image.

12. The imaging apparatus according to claim 10, wherein the at least one processor is further configured to determine the first photographing mode based on the imaging apparatus that is fixed on a tripod.

13. The imaging apparatus according to claim 10, wherein the at least one processor is further configured to determine the first photographing mode based on an elevation angle of the imaging apparatus.

14. The imaging apparatus according to claim 10, wherein the at least one processor is further configured to determine the first photographing mode based on a degree of darkness of the live view image.

15. The imaging apparatus according to claim 10, wherein the at least one processor is further configured to determine the first photographing mode based on a degree of likelihood of a night scene of the live view image.

16. The imaging apparatus according to claim 1, wherein the at least one processor is further configured to reduce a size of the live view image based on addition of a plurality of pixels to the live view image for adjustment of the angle of view of the scene.

17. A photographing method, comprising:
in an imaging apparatus:
setting a first exposure time of a live view image of a scene in a first photographing mode,
wherein the first photographing mode is set to photograph the live view image of the scene, displayed on an electronic view finder (EVF), at determined time intervals;
setting a second exposure time to photograph an image of the scene, after displaying the live view image photographed at the first exposure time, based on a user operation,
wherein the user operation includes adjustment of an angle of view of the scene, and
wherein the first exposure time is longer than the second exposure time; and limiting an exposure time up to a specific exposure time to photograph the live view image of the scene in a second photographing mode,
wherein the limited exposure time is shorter than the first exposure time.

18. A non-transitory computer-readable medium having stored thereon computer-readable instructions that, when executed by a processor, cause a computer to execute operations, the operations comprising:
  setting a first exposure time of a live view image of a scene in a first photographing mode,
    wherein the first photographing mode is set to photograph the live view image of the scene, displayed on an electronic view finder (EVF), at determined time intervals;
  setting a second exposure time to photograph an image of the scene, after displaying the live view image photographed at first exposure time, based on a user operation,
  wherein the user operation includes adjustment of an angle of view of the scene, and
  wherein the first exposure time is longer than the second exposure time; and
  limiting an exposure time up to a specific exposure time to photograph the live view image of the scene in a second photographing mode,
  wherein the limited exposure time is shorter than the first exposure time.

* * * * *